Jan. 14, 1930. W. E. HATCH 1,743,452
TOURNIQUET
Filed Nov. 2, 1928
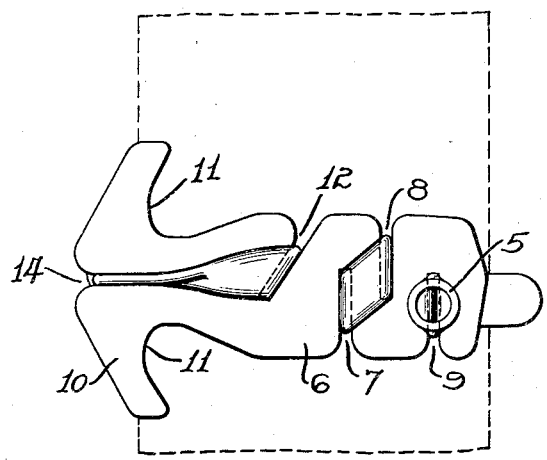
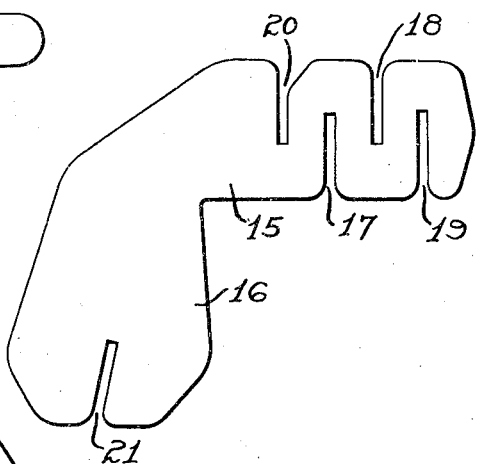
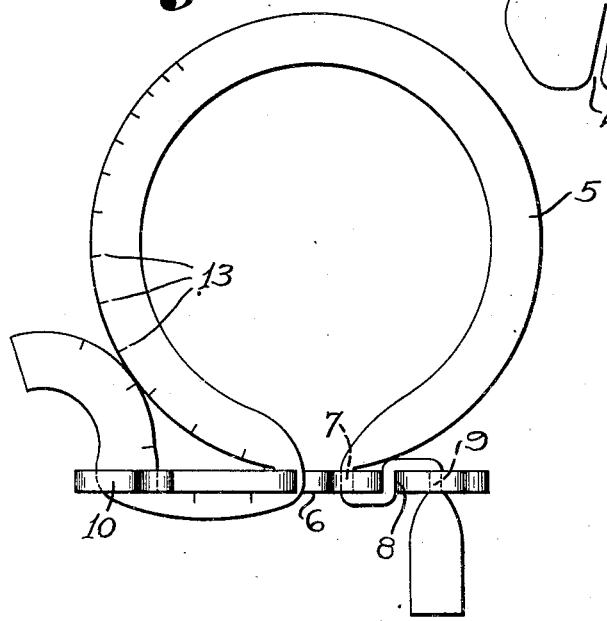

Patented Jan. 14, 1930

1,743,452

UNITED STATES PATENT OFFICE

WALTER E. HATCH, OF TOLEDO, OHIO

TOURNIQUET

Application filed November 2, 1928. Serial No. 316,706.

This invention relates to a tourniquet and especially to the means for securing the same on the arm or other member to which it is applied.

Hitherto, whenever it has been necessary to use a tourniquet, it has been the usual practice to take a length of plain elastic rubber tubing, stretch the same about the arm or other member on which it is used, intertwine the ends and tuck them beneath the encircling portion of the loop thus formed, to be held by the pressure of the latter against slipping. The pressure of such a device on the veins is inaccurately determined, its retention is uncertain, and an unusually steady hand is required to release the same without jerking.

With the above facts in mind, the object of my invention is to provide means by which a tourniquet can be easily and quickly applied so that it will be securely held in propper position and just as readily removed by a uniform and steady movement of the operator's hand.

In the preferred form of the invention, provision is also made for determining accurately the pressure to be applied, notwithstanding the fact that the tourniquet may be used from time to time on members which differ widely in size.

The specific construction of the invention and the advantages thereof will be more particularly explained in connection with the accompanying drawings, in which—

Figure 1 is a plan view of the device in operative position.

Figure 2 is a side elevation of the same.

Figure 3 is a plan view of a modified form of the securing means.

As illustrated in the drawings, the invention is adapted to be used in connection with an elastic member 5 which is stretched about the arm or other member, indicated by dotted lines in Figure 1. The elastic member 5 consists preferably of a length of rubber tubing, the ends of which are adapted to be held in a securing member 6, preferably formed of non-corrodible metal or alloy.

The securing member 6 has a flat shank with slots 7, 8 and 9, formed alternately in the opposite edges thereof. These slots are sufficiently narrow so that the tube 5 can be drawn into the same only by stretching. The slots extend inwardly from the edges of the shank substantially in perpendicular relation thereto and the end portion of the tube 5 is stretched and roven through the successive slots as shown in Figures 1 and 2. When the tube is released, its inherent elasticity causes it to be firmly held in the slots and it will not ordinarily be detached therefrom except when, after years of use, it is necessary to renew the tubing.

The securing member 6 is formed with a head 10, which is shaped so that it may be conveniently held in the operator's hand, as for example, by inserting the first two fingers in the recesses 11. In applying the tourniquet to the arm of the patient, the head 10 is grasped by one hand of the operator and the free end of the tubing 5 is drawn about the arm by the operator's other hand and inserted in a slot 12 formed in the edge of the shank near the slot 7. If the slot 12 is inclined inwardly toward the head 10, as shown in Figures 1 and 2, the tubing will be held more firmly than if the slot is perpendicular to the edge of the shank. The angle of the slot 12, therefore, may be so determined as to hold the tubing with sufficient firmness, while not offering too much resistance when the tourniquet is released.

The surface of the tubing 5 may be marked with graduations 13 to indicate the various degrees of pressure which it may be desired to use for various purposes. The distance between any two consecutive graduations is substantially proportional to the distance of the same from the portion of the tubing which engages the slot 7, so that the distance between two such graduations always represents the same variation in pressure regardless of the size of the arm or other member to which the tourniquet is applied.

When the tourniquet is applied as a temporary measure, it may be adequately secured merely by drawing the tubing through the slot 12. When it is necessary, however, to leave the tourniquet on for a considerable time, as for instance, while a patient is being conveyed in an ambulance, the tourniquet may be made doubly secure by drawing the end of the tubing through a slot 14 formed in the head 10.

For applying the tourniquet in certain positions it is preferable to use a securing member of modified form as indicated at 15 in Figure 3. The securing member is formed with a handle 16 approximately in the shape of a pistol grip. The slots 17, 18 and 19 are formed in the shank substantially in the same manner as the slots 7, 8 and 9 in the form illustrated in Figures 1 and 2. The slot 20, for securing the other end of the tubing is shown as extending at right angles to the edge of the shank, but, as explained above, it may be desirable to vary the angle to meet certain conditions. A slot 21 may be formed in the end of the handle 16, to serve the same purpose as the slot 14.

From the foregoing description, it will be seen that I have provided a device by which either end of the tube may be very quickly and easily secured or released. The securing means is reversible so that it may be applied to either arm either by a right handed or left handed operator. The securing means is all formed in one integral piece so that there are no moving parts to cause trouble or to get out of order. The device utilizes the same factors as obtained in using an ordinary rubber tube, without any of the objectionable factors which have heretofore been present.

The invention is especially desirable for use in intra-venal medication, since the tourniquet may be released by the operator without jerking, pulling or jarring the arm, thus obviating any tendency to displace the needle. The use of the scale markings 13 is desirable but not essential to the successful operation of the invention.

While I have shown and described in considerable detail the important features of the invention, it is apparent that the size, shape and arrangement thereof may be considerably modified from the forms shown herein, without departing from the scope of the invention as claimed.

What I claim is:

1. A tourniquet comprising an elastic member, a securing member having slots through which one end of the elastic member may be roven, and having another slot into which the other end of the elastic member may be drawn and graduations near the last mentioned end of the elastic member, the distance between any two consecutive graduations being substantially proportional to the distance of the same from the nearest of the first mentioned slots, as measured along the length of the elastic member.

2. A tourniquet comprising an elastic member, a securing member having means for securing the end portions of the elastic member thereto, and indicating marks near one end of the elastic member and so arranged that the distance between any two consecutive marks is substantially proportional to the distance of the same from the point where the other end is secured, as measured along the length of said elastic member.

3. A tourniquet comprising a shank with a series of slots therein, a handle at one end of the shank, an elastic member having an intermediate loop forming portion with one end portion extending from said loop forming portion through an intermediate slot in the shank and thence through a slot between said intermediate slot and the end of the shank remote from the handle, the other end portion of the elastic member, when the tourniquet is applied to a limb, extending through a slot between said intermediate slot and the handle.

4. A tourniquet comprising a shank with a series of slots therein, a transversely disposed handle forming a head at one end of the shank, and formed on its inner side with finger recesses, an elastic member having an intermediate loop forming portion with one end portion extending from said loop forming portion through an intermediate slot in the shank and thence through a slot between said intermediate slot and the end of the shank remote from the handle, the other end portion of the elastic member, when the tourniquet is applied to a limb, extending through a slot between said intermediate slot and the handle, the slot which receives said last mentioned end portion being inclined inwardly at an oblique angle toward the handle, said head having a slot formed in its outer side to receive the extremity of said last mentioned end portion.

In testimony whereof I have hereunto signed my name to this specification.

WALTER E. HATCH.